United States Patent [19]

McGrail et al.

[11] 4,401,014
[45] Aug. 30, 1983

[54] AUTOMATIC COFFEE-BREWING APPARATUS

[76] Inventors: John F. McGrail; Lois M. McGrail, both of 7701 Warner Ave., C197, Huntington Beach, Calif. 92647

[21] Appl. No.: 323,679

[22] Filed: Nov. 23, 1981

[51] Int. Cl.³ .............................................. A47J 31/18
[52] U.S. Cl. ...................................... 99/283; 99/287; 99/320
[58] Field of Search ................. 99/287, 288, 297, 282, 99/320, 283, 298; 426/77

[56] References Cited

U.S. PATENT DOCUMENTS

| | | | |
|---|---|---|---|
| 1,029,939 | 6/1912 | McLean | 99/320 |
| 1,709,657 | 4/1929 | Clinton | 99/287 |
| 2,342,108 | 2/1944 | Appleman | 99/320 |
| 2,368,496 | 1/1945 | Sharp | 99/320 |
| 3,072,042 | 1/1963 | Davis | 99/287 |

Primary Examiner—Robert W. Jenkins
Attorney, Agent, or Firm—Francis X. LoJacono

[57] ABSTRACT

An automatic coffee-brewing apparatus designed as an improved brewing device for ground coffee similar to the ones employed in the drip process. The brewing apparatus includes a container defining a coffee pot arranged to be removably supported by an electric heating plate, a floatable brew basket being releasably mounted within the coffee pot and including at least one floatational cell or chamber, whereby the brew basket is allowed to be released by a thermal latch in order to float on top of the brewed coffee at a predetermined temperature. A free-wheeling impeller is located within the brew basket and arranged to be rotated during the brewing process by a motor which is magnetically coupled to the impeller to cause rotation thereof.

11 Claims, 10 Drawing Figures

AUTOMATIC COFFEE-BREWING APPARATUS

BACKGROUND OF THE INVENTION

1. Field of the Invention

This invention relates to a brewing apparatus, and more particularly to a unique improved brewing device which allows the coffee granules to be brewed or steeped at a specific temperature for a specific predetermined time period, whereby the coffee granules are automatically separated from the brewed coffee—all within the brew pot.

2. Description of the Prior Art

It is well known in the art that various problems and difficulties are being encountered in providing suitable means for brewing or making coffee in a more efficient and economical manner, so that a much higher percentage of desirable soluble solids or substance can be extracted from the coffee granules during the brewing process.

There are many known methods for brewing coffee, such as percolation whereby hot water is oozed or trickled through various grades of ground coffee, by the well known drip method, or by the decoction method—better known as "steeping".

However, most of the known available brewing devices have features that restrict their use, and they are often complicated to operate and expensive to maintain. For example, most of the known devices do not provide suitable means to extract the full essence from the granules in the form of soluble solids, so that an appreciable amount of coffee is wasted because it is not utilized to the fullest extent.

Therefore, it can be seen that there is a tremendous need for a device which brews coffee in a more efficient manner, so that the amount of granules required could be considerably reduced.

SUMMARY OF THE INVENTION

The present invention has for an important object to overcome the above-mentioned difficulties and problems encountered with the present known coffee-making devices. The following disclosure of this unique automatic coffee-brewing apparatus teaches a novel arrangement that includes a floatable basket which is releasably secured to the bottom area of the brew basket by means of a thermal-release latching device which allows the extraction of soluble solids from the ground coffee for brewing at a specific predetermined temperature. That is, the granules are supported above the liquid by at least one floatational cell formed as part of the brew basket.

It is another object of the invention to provide an automatic coffee-brewing apparatus that includes a means to agitate and stir the coffee granules during the heating cycle of the brewing process, whereby all the granules are assured a thorough soaking for maximum extraction, and to further provide an even dispersion of the solubles throughout the brew.

Still another object of the invention is to provide an automatic coffee-brewing apparatus that provides for a magnetic coupling device between a motor mounted in a base-heating plate and a rotatable impeller mounted in the granule basket, in order to establish agitating action therein.

It is still another object of the present apparatus to provide a hot plate for receiving the coffee pot that includes a motor having a magnetic coupling, as mentioned above, and a thermostatically controlled heating element, whereby all of the electrical components are disposed remotely from the coffee pot.

It is a further object of the invention to provide a coffee brewer of this character that combines the drip process with the steeping of the ground coffee during the period the brew water is being heated, so as to extract approximately ten to fourteen percent more of the desirable soluble solids, the preparation time per cup being approximately the same as that required for most of the presently marketed coffee makers.

Still another object of the invention is to provide an apparatus of this character that is simple to service and maintain.

A further object of the invention is to provide one embodiment of the present invention comprising a single floatational cell formed as the bottom portion of the brew basket, the basket being supported on the guide column which services two purposes—first, to allow the brew basket to be locked to the thermallatch mechanism prior to and during brewing of the coffee, whereby the basket is held below the water surface until a given temperature is obtained; and, second, to provide a means for the basket to pivot and latch in a remote position from the brewed liquid.

Still a further object of the present invention is to provide a brew basket that includes a plurality of extendable floatational cells.

The characteristics and advantages of the invention are further sufficiently referred to in connection with the accompanying drawings, which represent one embodiment. After considering this example, skilled persons will understand that variations may be made without departing from the principles disclosed; and we contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only.

DESCRIPTION OF THE PREFERRED EMBODIMENT

Figure 1:
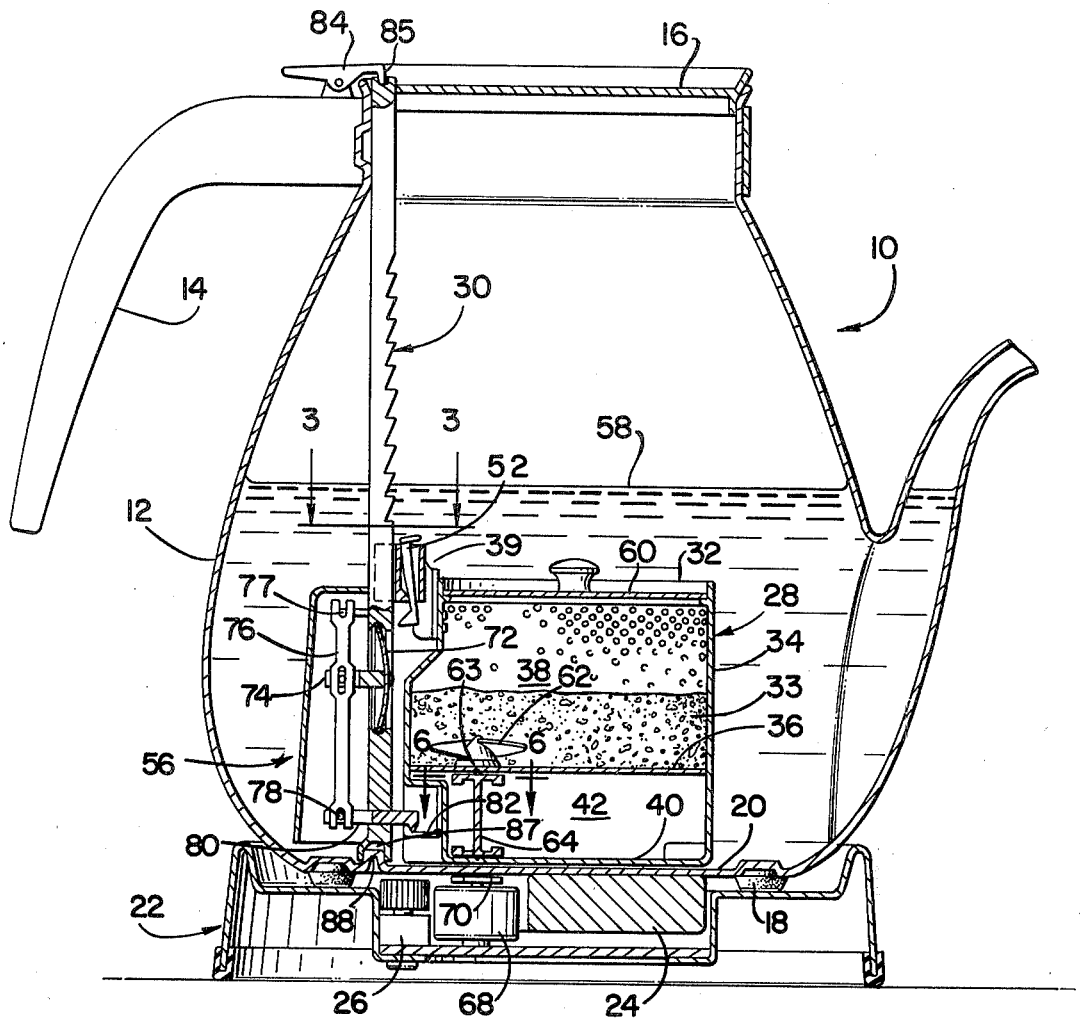
FIG. 1 is a substantially vertical cross-sectional view of the coffee pot wherein the brew basket is latched in a brewing position so as to be submerged below the water level.
Figure 5:
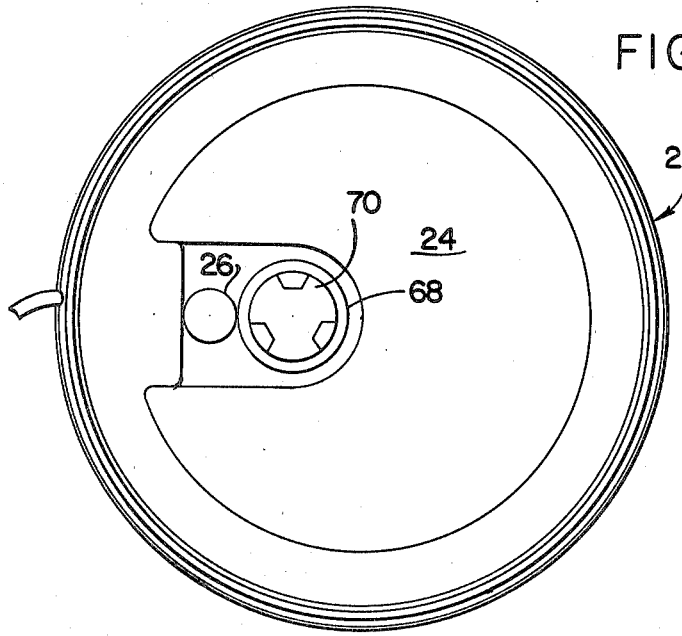
FIG. 5 is a top-plan view of the hot-plate base.

Referring more particularly to FIG. 1, there is shown a new improved automatic coffee-brewing apparatus, generally designated at 10, comprising a suitable container 12 which will hereinafter be referred to as a "coffee pot". The coffee pot 12 can be in any suitable configuration which can comprise a handle 14 and a cover 16, with foot pads 18 being attached to the bottom wall 20 of the pot. To establish a remote means for heating the water to a brewing temperature, there is provided a trivet or hot plate, indicated generally at 22, which is adapted to support coffee pot 12, whereby the bottom wall 20 contacts the heating element 24 (also shown in FIG. 5). Heating element 24 is also provided with a thermostatic control 26, allowing the heating element to be set at a predetermined temperature from 0° F. to a recommended maximum of 200° F.

Removably positioned in the coffee pot 12 is a coffee-brewing module, generally indicated at 28, which is adapted to be slidably located along a vertically disposed strut or column member 30, the strut being part of a means to allow the module to be positioned and locked into place above the level of the water to be used in the brewing of the coffee.

Coffee brewing module 28 comprises a brew basket 32 having a substantially annular perforated wall 34 and an intermediate wall 36 which define a brew compartment 38 in which the coffee granules are stored for use. A bottom wall 40 is also formed so that together with walls 34 and 36 there is defined a sealed floatational cell or chamber 42.

Figure 3:
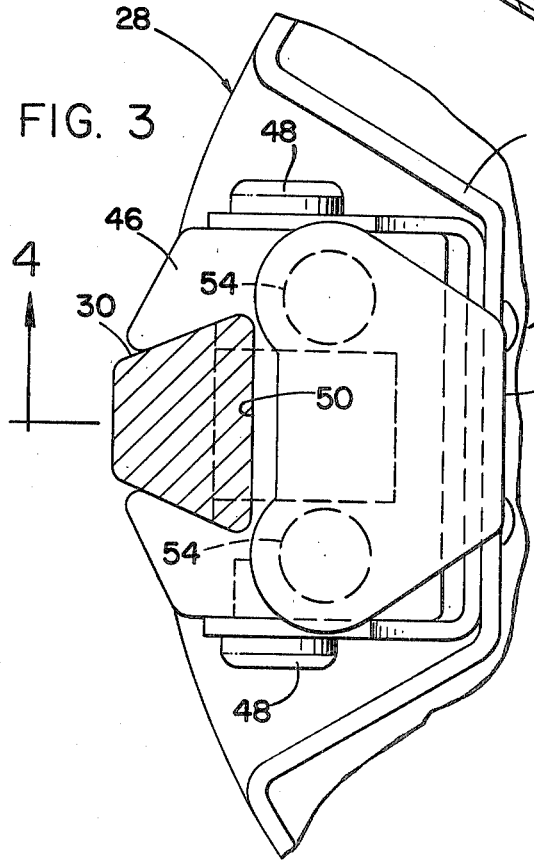
FIG. 3 is an enlarged cross-sectional view taken substantially along line 3—3 of FIG. 1, showing the position of the mounting strut and the strut-latching device.
Figure 4:
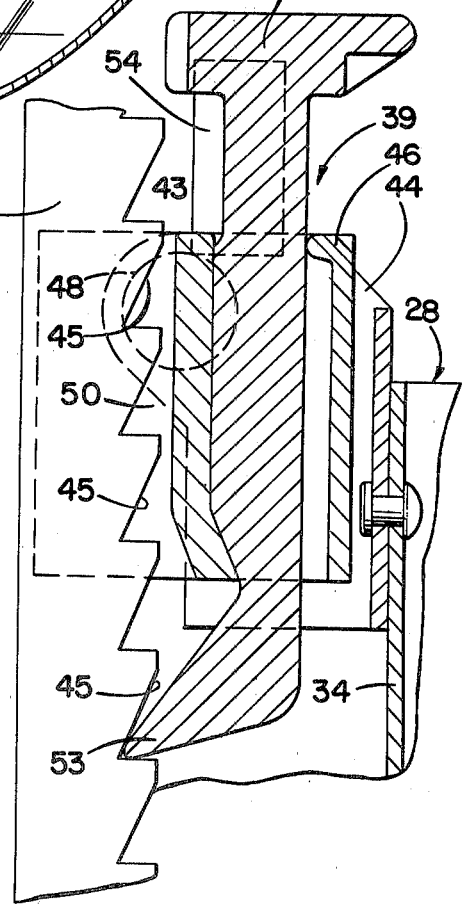
FIG. 4 is a cross-sectional view taken substantially along line 4—4 of FIG. 3, showing the latching arm thereof engaging a ratchet tooth formed on the strut member.

Affixed to the upper portion of brew basket 32 is a hinged latching means 39 forming the other part of the basket-positioning-and-locking means which includes strut 30, the basket-positioning-and-locking means being more clearly illustrated in FIGS. 3 and 4. Strut 30 is formed having a plurality of camfaced teeth members 43 disposed substantially on the upper half thereof, whereby latching means 39 is prevented from engaging the teeth members when the brew basket is secured in a submerged brewing position, as indicated in FIG. 1. Hinge-latch means 39 comprises a hinge member 44 secured to basket wall 34 and hingedly connected to slide bracket 46 by the pin 48. Slide bracket 46 is provided with a substantially V-shaped groove 50 adapted to be slidably mounted to strut 30, as seen in FIG. 3. As illustrated in FIG. 4, latch means 39 further includes a latch-pawl member 52 which is normally biased upwardly by the biasing means 54. The biasing means can comprise a pair of springs or cylindrical resilient rubber plugs. Latch pawl 52 is slidably supported in bracket 46 and adapted to be cammed free of teeth 43 by pressing downwardly on pawl 52, shown in FIG. 1.

Accordingly, when coffee is to be brewed, coffee granules 33 are placed in basket 32, pawl member 54 of latch means 39 is released from the teeth section of strut 30, and module 28 is pushed to the bottom of pot 12 against or adjacent wall 20. At this time, the module is locked in place by thermal-release-locking means, generally indicated at 54, after which water is placed into pot 12 to cover the coffee granules. FIG. 1 shows the module being totally submerged below water level 58. Heating element 24 is then activated so as to heat the water to a temperature considered best for brewing coffee, which is approximately 187° F.

Figure 6:
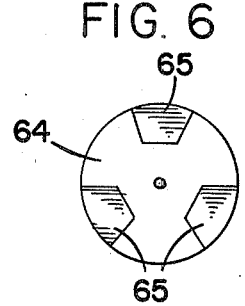
FIG. 6 is a top-plan view of a magnetic-coupling spool as seen from line 6—6 of FIG. 5.

During the heating-and-brewing process, the coffee granules are agitated and circulated within basket 38 and held therein by cover 60. The agitating means comprises a rotatable impeller 62 mounted within the basket portion 38 directly above a magnetic spool 64 which is rotatably secured in floatation cell 42. Spool 64 can be either formed from a magnetic material or it can include a plurality of magnetic insets 65, as shown in FIG. 6. Impeller 61 also includes a corresponding magnetic member 63, and it will be remotely rotated together with the corresponding rotation of spool 64, since the spool is also rotated by motor 68 provided with a third magnetic member 70 positioned under and aligned with spool 64, the motor and its magnetic member 70 being remotely mounted in the base hot plate 22. The complete circulation of the coffee granules 33 during the brewing period will insure their thorough moistening, allowing a larger number of soluble solids to be released from the granules—thus providing a richer brew than was previously possible with the same given amount of ground coffee.

Figure 2:
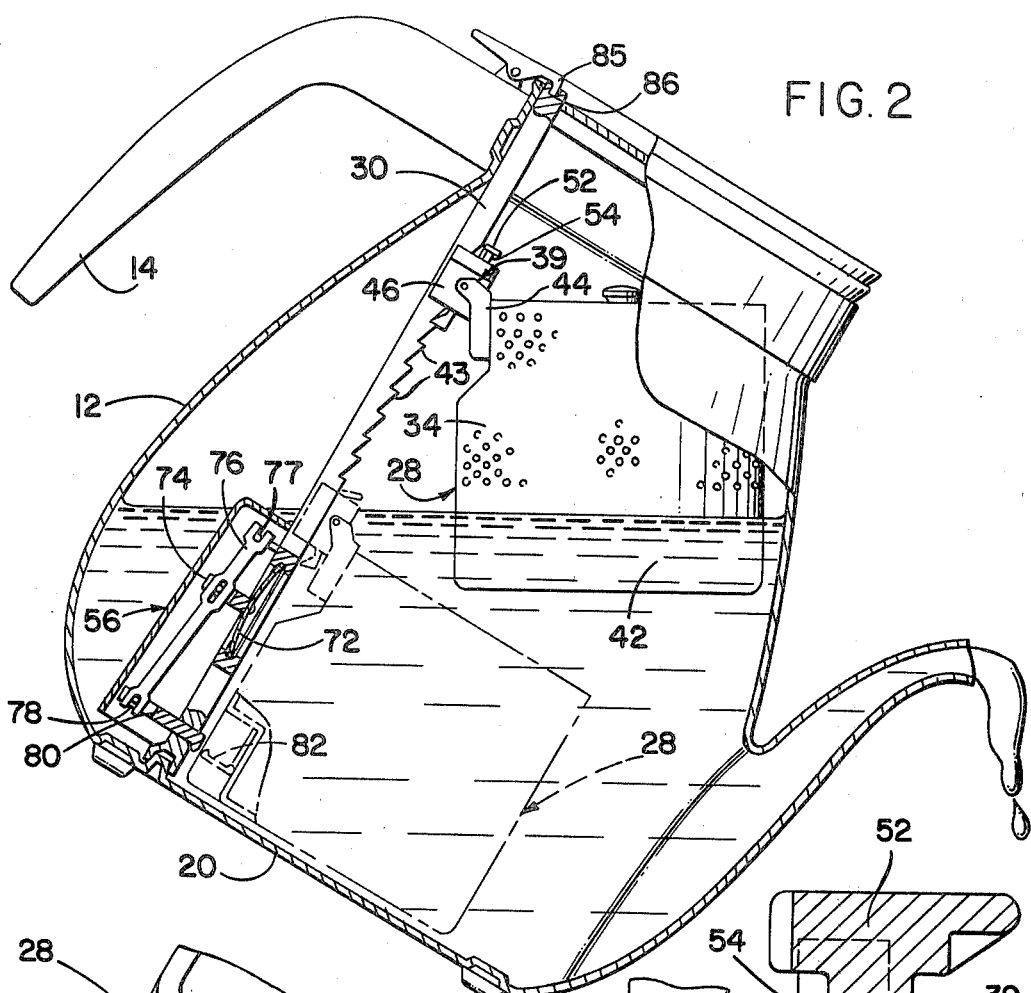
FIG. 2 is a similar cross-sectional view of the coffee pot wherein the brew basket is shown in a released floating mode after the coffee has been brewed and is locked into place above the water level, to allow for pouring of the brewed coffee as shown.

When the predetermined brew temperature is reached, the thermal-release-locking means is activated by the set temperature, thereby releasing module 28 and allowing it to float to the top of the brewed coffee, whereby only the floatational-cell section 42 remains in the liquid. FIG. 2 illustrates the module 28 floating on top of the brewed coffee, even as the pot is placed in a pouring position. That is, hinge means 39 allows module 23 to float at any angle during pouring of the coffee, and is locked into the fully upward position by the pawl 58 which engages an adjacent tooth member 43. As the module moves up on the strut 30, the pawl tongue member 53 will slide over the cam sides 45 of the teeth 43.

The thermal-release-locking means 56 comprises a bimetal disc 72 (petrie disc-shaped) mounted in strut 30 adjacent the lower end thereof and provided with a projecting pin 74 pivotally attached to actuating bar 76. Bar 76 is vertically arranged and pivotally attached to strut 30 at its upper end 77. The lower end of bar 76 is linked at 78 to lock arm 80 which is slidably supported by the lower end of strut 30 arranged to couple with latch tongue 82 when module 28 is in a brew position. That is, when module 28 is moved downwardly, tongue 82 hinges upwardly as it passes over the locking end of lock arm 80 and then drops into a locked position, as seen in FIG. 1. Hence, module 28 is locked in a submerged position until the temperature of the water affects the thermal disc 72, at which time it snaps outwardly and causes activating bar 76 to pivot outwardly so as to move locking bar 80 from engagement with latch tongue 82, as seen in FIG. 2, whereby module 28 is free to float to the top of the brewed coffee.

It should be noted that module 28 can be removed from pot 12 at any time for cleaning by raising module 28 until it separates from strut 30. Once module 28 is removed, strut 30 can be removed by releasing clamp 84 secured at the top of coffee pot 12. Clamp 84 includes lip 85 which is received in slot 86 formed in the upper free end of strut 30. The lower end of struct 30 is formed having a recess 87 adapted to fit over boss 88 formed in bottom wall 20, whereby strut 30 is held in perpendicular relationship with bottom wall 20.

ALTERNATIVE EMBODIMENT

Referring now to the invention as illustrated in FIGS. 7 through 10, there is shown a container defining a coffee pot, designated at 90, designed to be supported on a hot-plate-base unit, indicated generally at 92. Base 92 includes a suitable heating means 93 controlled by an electric thermostatic-switch means 91, whereby the water temperature is to be raised to approximately 187°. However, heating means 93 includes a low-temperature heating element 94 and a high-temperature heating element 95. An ON/OFF switch can also be provided, but is not shown.

FIG. 1 illustrates a coffee-brewing module, generally designated at 96, which comprises the following three essential components.

First, coffee basket 98 is defined by an annular perforated wall 99 and a bottom wall 100 in which coffee granules 102 are stored for brewing.

Second, an agitating means comprises a spring-operated motor 104 mounted to the outside of cover plate 105 and enclosed in motor housing 106. A blade or impeller 108 is mounted on the opposite side of cover 105, so as to be disposed within basket 98. A magnetic coupling means is provided whereby motor 104 is adapted to rotatably drive a magnetic member 110 positioned directly above but remotely from the impeller 108, which is also provided with a corresponding magnetic member 112. Thus, as magnetic member 110 rotates, member 112 will also rotate in the same direction and at the same speed, causing the impeller to agitate and stir the coffee granules in basket 98.

Third, there is attached to the bottom wall 100 a plurality of floatational cells 114, each defining a floatation chamber 115 pivotally attached to the bottom wall 100 by pivot pins 116. The floatational cells or segments 114 are spring-biased so that they are automatically deployed radially outward, once the brew module 96 is in a locked position in the bottom of the coffee pot.

Figure 7:
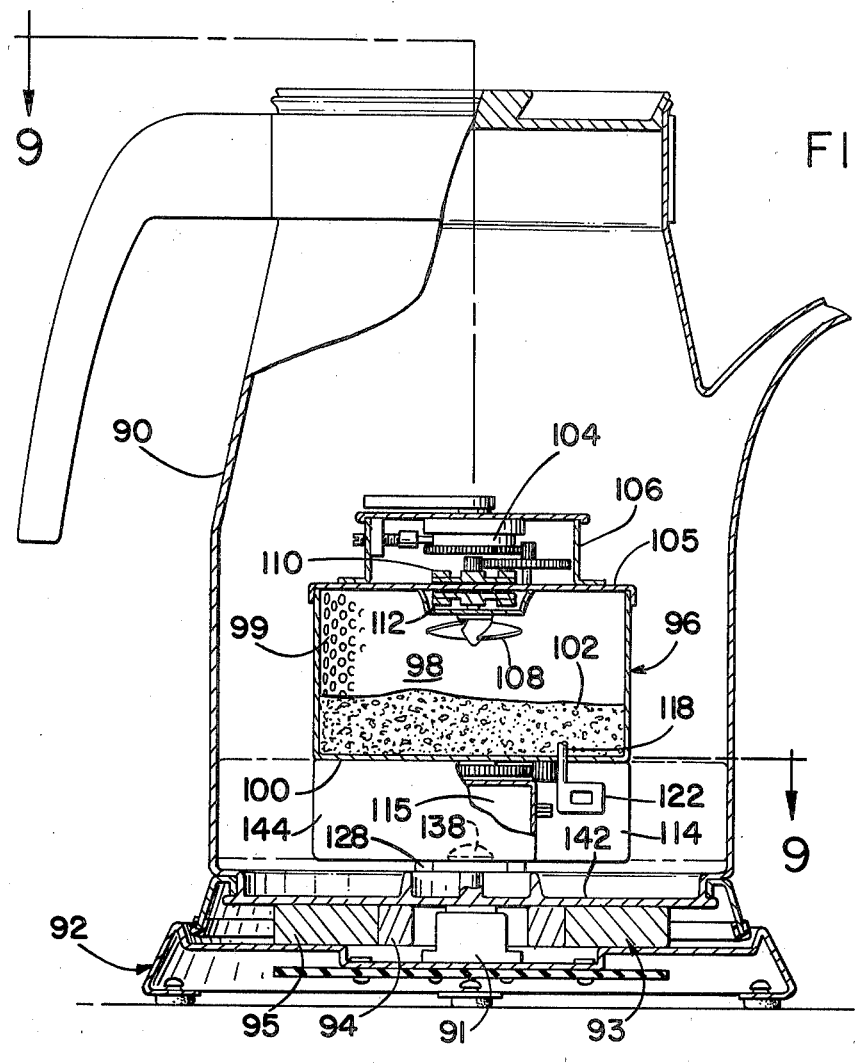
FIG. 7 is a substantially vertical cross-sectional view of an alternative arrangement of the present invention, showing the basket in a brewing mode and the floatational cells in a closed position.
Figure 9:
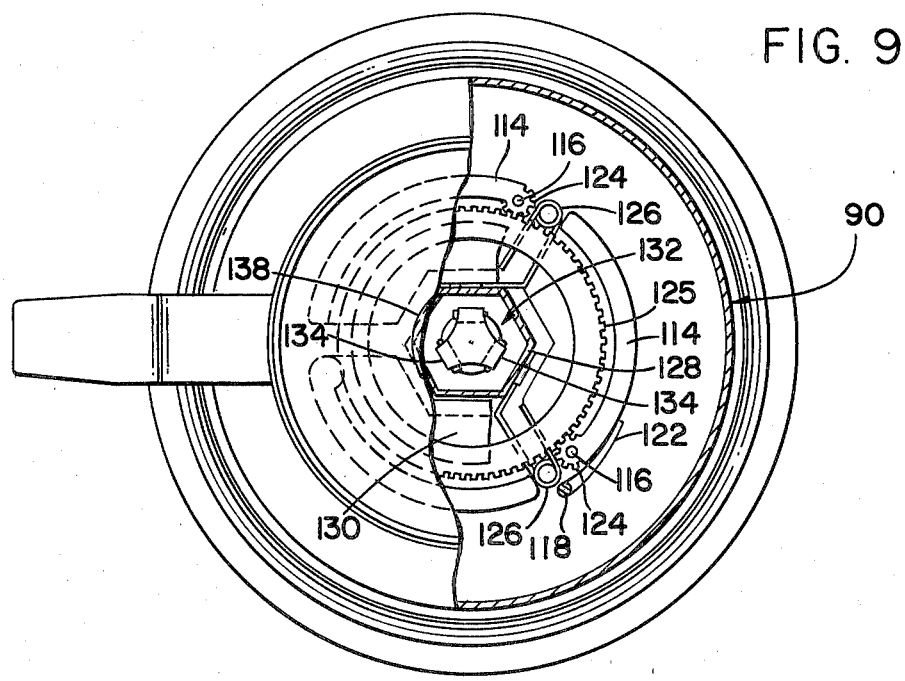
FIG. 9 is a top-plan view of the coffee pot, with a portion thereof broken away and in cross-section to illustrate the closed mode of the respective floatational cells.

In FIGS. 7 and 9 the floatational cells 114 are shown in a retracted position. In order to position and secure the cells in a retracted mode, there is provided rod 118 which is rotatably mounted to basket 98 having a laterally extended upper flange member 120 and a laterally extended lower flange member 122. When upper flange member 120 is pressed inwardly, the lower flange member engages one of the cells 114, thus causing the cell to rotate inwardly and thereby retracting all of the other cells at the same time. To accomplish the simultaneous movement of the floatational cells, each cell or segment is provided with a pivot gear member 124 disposed around respective pins 116, whereby each gear 124 engages a central gear ring 125. The movement of one floatational cell will cause ring gear 125 to rotate and move the remaining cells.

Figure 10:
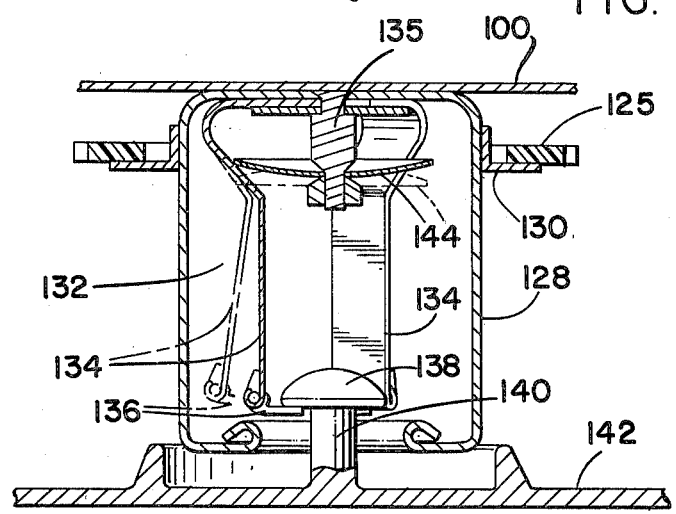
FIG. 10 is an enlarged cross-sectional view of the thermal-release-latch assembly with is secured to the underside of the brew basket.

Thus, the cells must be in a retracted position when loading the brew module in the coffee pot, as indicated in FIGS. 7 and 9. When flange 120 is released, the floatational cells 114 are forced outwardly by a biasing means, such as springs 126 which are secured to a central depending housing 128. Housing 128 further includes a radial flange member 130 which supports ring gear 125, as seen in FIG. 10.

Figure 8:
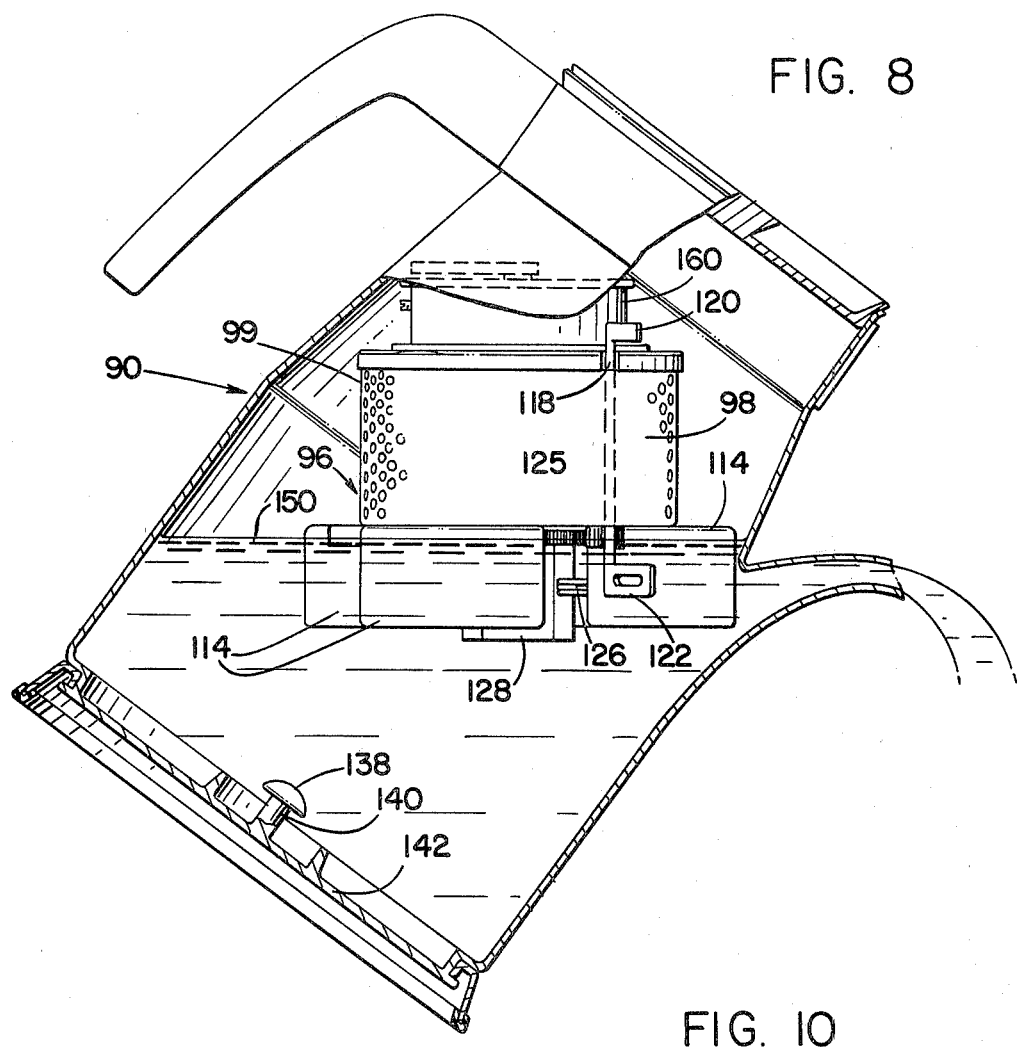
FIG. 8 is a similar cross-sectional view of the coffee pot as in FIG. 7, with the basket in a released floating mode and with the floatational cells in an open position for supporting the basket above the liquid level.

Also located within housing 128 is a thermal-release-locking means, generally indicated at 132. The thermal-release-locking means comprises a plurality of depending flexible fingers 134 which are secured within housing 128 by the support pin 135. The lower free end of each finger 134 includes a hinged latch member 136 adapted to latch under head 138 of keeper 140, keeper 140 being formed as part of the bottom wall 142. A bimetal thermal disc 144 is secured to support pin 135 and, when in a normal inactive mode, allows flexible fingers 134 to close—thus locking latch members 136 under head 138, as seen in FIG. 10. As the heat of the water reaches the maximum brewing temperature (approximately 187° F.), thermal disc 144 engages fingers 134, thus forcing them outwardly and releasing latch member 136. At this time, brew module will rise and float to the top of the liquid level 150, as seen in FIG. 8, with the basket 98 being supported above the liquid by the extended floatational cells—so that the coffee granules are no longer submerged in the brewed coffee. Due to the arrangement of the floatational cells 114, module 96 will always float in an upright position, even when brewed coffee is poured from the pot as illustrated.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and we do not wish to be restricted to the specific form show or uses mentioned, except as defined in the accompanying claims.

I claim:

1. An automatic coffee-brewing apparatus comprising:

a coffee pot;

a floatable brew module, said module being adapted to be releasably secured in a submerged position within said coffee pot, said floatable brew module comprising:

a basket adapted to receive and store coffee granules therein; and at least one floatational cell attached to the underside of said basket, whereby said module is allowed to float after the coffee has been brewed;

means for releasably securing said module in a submerged position within said coffee pot, said releasable securing means comprising a thermal-release locking means;

means for heating water in said coffee pot to a brewing temperature, said means being located remotely from said coffee pot, and wherein said heating means comprises a hot plate containing a controlled heating element on which said coffee pot is supported;

means to agitate and stir said coffee granules and said water during brewing thereof, said agitating-and-stirring means comprising an impeller rotatably mounted in said basket of said module;

means for rotating said impeller remotely from said basket, wherein said means for rotating said impeller comprises:

a first magnetic member formed as part of said impeller;

an opposing remote second magnetic member adapted to be magnetically coupled to said magnetic member of said impeller; and a motor adapted to rotate said remote second magnetic member, whereby said first magnetic member of said impeller will rotate therewith.

2. An automatic coffee-brewing apparatus as recited in claim 1, wherein said means for rotating said impeller includes a third magnetic member mounted in said floatational cell and interposed between said first and second magnetic members, each being magnetically coupled to the other.

3. An automatic coffee-brewing apparatus as recited in claim 2, wherein said thermal-release locking means comprises:
- a strut member removably mounted in said coffee pot;
- a bimetal thermal disc mounted on said strut and located so as to be submerged under said water within said pot, in order for said thermal disc to be affected by the temperature of said water;
- a plurality of link members, including a lock-arm member, connected to said thermal disc; and
- a latch-tongue member operably attached to said module for locking engagement with said lock arm.

4. An automatic coffee-brewing apparatus as recited in claim 3, wherein said brew module includes a hinged latching means mounted to the upper portion of said basket, and adapted to be slidably mounted to said strut member, said strut member including a plurality of teeth formed thereon for engagement with said hinged latching means.

5. An automatic coffee-brewing apparatus as recited in claim 4, wherein said hinged latching means comprises:
- a hinge member affixed to said basket;
- a slide bracket adapted to be connected to said hinge member to allow said basket to pivot relative to said slide bracket, said bracket including a groove to receive said strut member therein; and
- a spring-biased latching pawl adapted to lock into one of said teeth on said strut member, whereby said brew basket is locked into a hinged position above the brewed coffee.

6. An automatic coffee-brewing apparatus as recited in claim 3, wherein said strut member includes means for releasably securing said strut in said coffee pot.

7. An automatic coffee-brewing apparatus as recited in claim 1, wherein said motor is located in said hot plate, and includes a thermostatic-switch means to control said heating element.

8. An automatic coffee-brewing apparatus as recited in claim 1, wherein said brew module includes:
- a plurality of said floatational cells, each being pivotally secured to said basket; and
- means connected to said floatational cells to move said cells simultaneously between an expanded and a retracted mode.

9. An automatic coffee-brewing apparatus as recited in claim 8, wherein said means to move said cells includes:
- a biasing means to bias said cells to an expanded position;
- means to retract said cells to a retracted position;
- a pivot gear formed on each of said cells; and
- a ring gear positioned to engage each pivot gear to cause simultaneous movement of said cells in either an expanded or a retracted direction.

10. An automatic coffee-brewing apparatus as recited in claim 1, wherein said thermal-release locking means comprises:
- a keeper member mounted within said coffee pot;
- a plurality of depending flexible finger members secured to said basket and adapted to engage said keeper member; and
- a bimetal thermal disc positioned within said depending flexible fingers to engage said fingers, whereby said fingers are disengaged from said keeper member when said bimetal thermal disc is activated by a preset brewing temperature, allowing said brew basket to float to the top of the brewed coffee and thereby supporting said coffee granules above said brewed coffee.

11. An automatic coffee-brewing apparatus as recited in claim 1, wherein said motor and said second magnetic member are located within a housing supported above said basket, said housing defining a basket cover.

* * * * *